O. H. HARRIS.
ANIMAL POKE.
APPLICATION FILED JULY 2, 1921.
1,417,245.
Patented May 23, 1922.
2 SHEETS—SHEET 2.
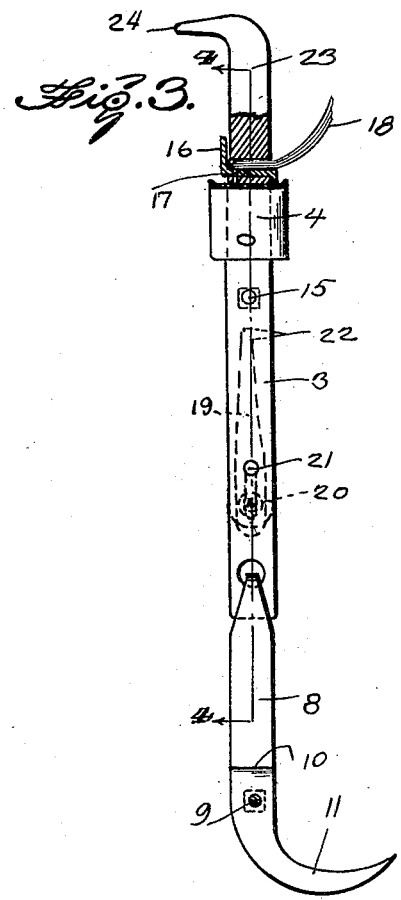
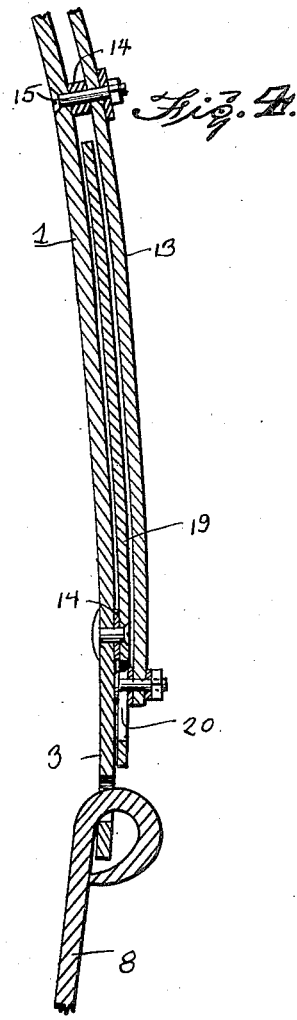
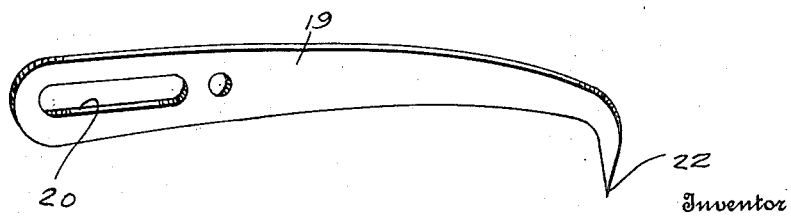
Inventor
Oliver A. Harris.
By Watson E. Coleman
Attorney

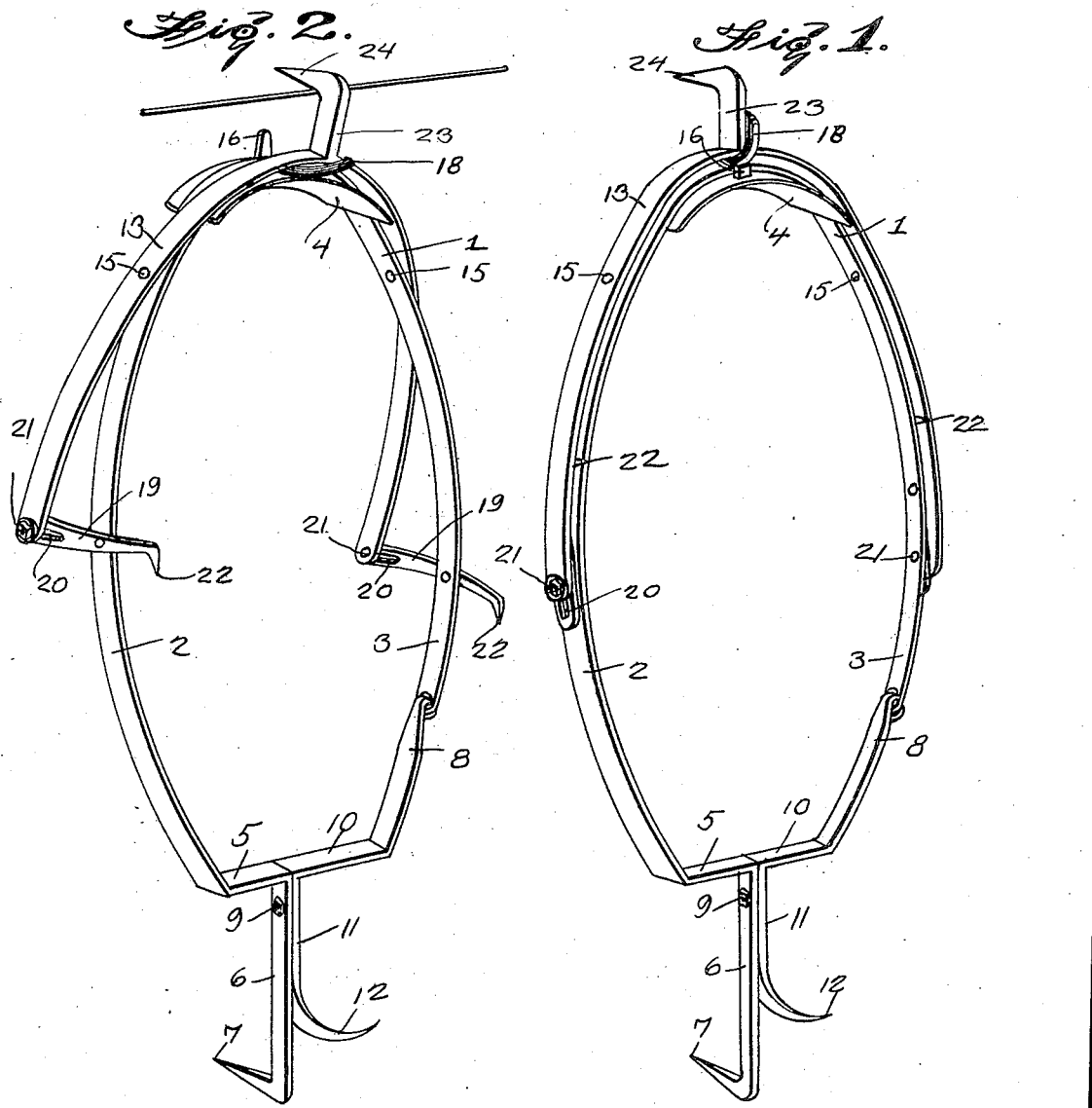

UNITED STATES PATENT OFFICE.

OLIVER H. HARRIS, OF MORO, ARKANSAS, ASSIGNOR OF ONE-FOURTH TO JOHN L. LEE, OF THOMASVILLE, ARKANSAS.

ANIMAL POKE.

1,417,245.            Specification of Letters Patent.      Patented May 23, 1922.

Application filed July 2, 1921. Serial No. 482,236.

*To all whom it may concern:*

Be it known that I, OLIVER H. HARRIS, a citizen of the United States, residing at Moro, in the county of Lee and State of Arkansas, have invented certain new and useful Improvements in Animal Pokes, of which the following is a specification, reference being had to the accompanying drawings.

This invention relates to animal pokes and more particularly to that type used upon breachy cattle to prevent their jumping or pushing their way through rail or wire fences.

The principal object of the invention is to provide a simple and efficient device of this character which may be rapidly and conveniently applied to the animal and which will permit of all ordinary movements but which will prevent the animal from jumping or breaking its way through rail or wire fences.

Other objects of the invention will appear as the following specific description is read in connection with the accompanying drawings which form a part of this application and in which:

Figure 1 is a perspective view of the yoke with the parts in normal position;

Figure 2 is a similar view showing the action of the pricking prongs when the animal attempts to get through a fence and engages the upper stang;

Figure 3 is a vertical transverse section;

Figure 4 is a detail section taken on the line 4—4 of Figure 3;

Figure 5 is a perspective view of one of the pricking prongs removed.

Referring more particularly to the drawing, 1 generally represents the neck yoke in which legs 2 and 3 are curved arcuately in opposite directions, as shown, to fit the neck of the animal. At the upper portion of the yoke I provide a neck saddle plate 4 which is adapted to prevent wearing the hair away and to make the use of the poke on the animal as easy as possible. The leg 2 is extended somewhat below the end of the leg 3 where it is provided with a lateral offset 5 having depending therefrom the stang 6, with the forwardly projecting hook 7 arranged at its terminal. The leg 3 has pivoted thereto a gate member 8 secured to the stang 6 in any suitable manner, as by the bolt 9 shown herein. The lower end of the gate member as shown, is provided with a lateral offset 10 to correspond with the offset 5 of the leg 2 and is provided with a short stang 11 having a rearwardly projecting pricking prong 12, the operation of which will be hereinafter described.

Encompassing the upper end of the yoke 1 is a second yoke 13 spaced from the yoke 1 by washers 14 but having substantially the same conformation as the upper end of the yoke 1. Passing through the yoke 13, yoke 1 and washers 14, are pivot bolts 15 which provide for the swinging of the yoke 13 upon the yoke 1, this swinging movement being limited in one direction by a stop 16 secured to the upper portion of the yoke 1, as shown in Figure 4. The bolt 17 which secures the stop to the yoke 1 also holds in position a leaf-spring 18 which permits rearward movement of the upper end of the yoke 13 against the tension of the spring and acts to return of the yoke 13 to normal position, shown in Figure 1.

Pivoted to the legs 2 and 3 of the yoke 1, on the outside thereof and lying between the legs of the yoke 1 and the legs of the yoke 13, are arms or levers 19 having their rear ends longitudinally slotted, as at 20, to be engaged by the headed studs or bolts 21 carried at the lower end of the legs of the yoke 13. The forward end of the levers 19 are provided with rearwardly extending pricking prongs 22, as shown in Figure 2.

At the upper end of the yoke 13 I provide a vertically extending stang 23 having a forwardly projecting hook 24, adapted, when the animal attempts to pass through a fence, to engage the wire or rail thereof and to move the upper end of the yoke rearwardly against the tension of the spring 18. This rearward movement of the upper end of the yoke 13 causes the lower ends to act upon the lower ends of the levers 19, the studs or bolts 21 sliding in the slots 20, as will be readily understood, which causes the pricking prongs to be engaged with the neck or shoulder of the animal, pricking the same and inflicting slight injury which will cause the animal to desist in any further attempts to go through the fence. In any attempt of the animal to jump the fence the hook 7 will engage the wire or rail and cause the yoke to tilt upon the neck of the animal which will bring the penetrating prong 12 into engagement with the underside of the neck of the animal with the same results.

It will thus be seen that I have provided a very simple and efficient device in which the pricking prongs when in normal position will not interfere with the ordinary movements of the animal, and which only act upon an attempt of the animal to force its way through a fence or jump the same.

What I claim is:

1. An animal poke comprising a neck yoke, an operating yoke straddling the upper portion of the neck yoke and pivotally connected therewith and normally aligned therewith, a fence engaging hook on said operating yoke for swinging the latter, and a pair of pricking prongs pivoted upon opposite sides of the neck yoke and pivotally and slidably connected with the ends of the operating yoke, the pricking points of said prongs being concealed intermediate the neck and operating yokes when said yokes are alined.

2. An animal poke comprising a neck yoke, an operating yoke straddling the upper portion of the neck yoke and pivotally connected intermediate its ends therewith, a pair of pricking prongs pivoted intermediate their ends upon opposite sides of the neck yoke and having their forward ends formed with slots, pivot members passing through said slots and through the ends of the operating yoke, and a fence engaging hook on said operating yoke at the uppermost portion thereof.

3. An animal poke comprising a neck yoke, an operating yoke straddling the upper portion of the neck yoke and pivotally connected intermediate its ends therewith, a pair of pricking prongs pivoted intermediate their ends upon opposite sides of the neck yoke and having their forward ends formed with slots, pivot members passing through said slots and through the ends of the operating yoke, a fence engaging hook on said operating yoke at the uppermost portion thereof, and spring means carried by the neck yoke and normally engaging the operating yoke whereby to hold the latter in registration with the neck yoke with said pricking prongs lying between and entirely covered by the neck yoke and the operating yoke.

In testimony whereof I hereunto affix my signature.

OLIVER H. HARRIS.